US010789157B2

(12) United States Patent
Jain et al.

(10) Patent No.: US 10,789,157 B2
(45) Date of Patent: Sep. 29, 2020

(54) SYSTEMS AND METHODS FOR DETECTING ANOMALIES IN EXECUTION OF COMPUTER PROGRAMS

(71) Applicant: Soroco Private Limited, London (GB)

(72) Inventors: Nishant Kumar Jain, Bangalore (IN); Rohan Narayan Murty, Bangalore (IN); George Peter Nychis, Somerville, MA (US); Harsh Gupta, Bangalore (IN); Yoongu Kim, Cambridge, MA (US)

(73) Assignee: Soroco Private Limited, London (GB)

( * ) Notice: Subject to any disclaimer, the term of this patent is extended or adjusted under 35 U.S.C. 154(b) by 224 days.

(21) Appl. No.: 15/968,401

(22) Filed: May 1, 2018

(65) Prior Publication Data
US 2018/0322004 A1 Nov. 8, 2018

Related U.S. Application Data

(60) Provisional application No. 62/561,139, filed on Sep. 20, 2017, provisional application No. 62/500,048, filed on May 2, 2017.

(51) Int. Cl.
*G06F 11/36* (2006.01)
*G06F 3/0481* (2013.01)

(52) U.S. Cl.
CPC ........ *G06F 11/3688* (2013.01); *G06F 3/0481* (2013.01)

(58) Field of Classification Search
CPC .... G06F 3/0481; G06F 3/0484; G06F 3/0489; G06F 11/079; G06F 11/3672; G06F 11/3688
(Continued)

(56) References Cited

U.S. PATENT DOCUMENTS 5,926,638 A * 7/1999 Inoue ................... G06F 11/3664
714/38.13
7,979,849 B2 * 7/2011 Feldstein ............ G06F 11/3692
714/39
(Continued)

FOREIGN PATENT DOCUMENTS

WO WO-2016206113 A1 * 12/2016 .......... G06F 11/3664

OTHER PUBLICATIONS

International Search Report and Written Opinion for International Application No. PCT/US2018/030422 dated Aug. 22, 2018.

*Primary Examiner* — Joseph R Kudirka
(74) *Attorney, Agent, or Firm* — Wolf, Greenfield & Sacks, P.C.

(57) ABSTRACT

According to at least one aspect, a system is provided. The system comprises at least one hardware processor; and at least one non-transitory computer-readable storage medium storing processor executable instructions that, when executed by the at least one hardware processor, cause the at least one hardware processor to perform: monitoring execution of a first computer program configured to control a second computer program to perform a task at least in part by controlling the second computer program, through a graphical user interface (GUI) and/or an application programming interface (API) for the second computer program, to perform at least one action in furtherance of the task; detecting at least one anomaly in the execution of the first computer program; and outputting the detected at least one anomaly in the execution of the first computer program.

23 Claims, 6 Drawing Sheets (58) Field of Classification Search
USPC .......................................................... 714/45
See application file for complete search history.

(56) References Cited

U.S. PATENT DOCUMENTS

| | | | | |
|---|---|---|---|---|
| 8,448,142 | B2* | 5/2013 | Squillace | G06F 11/3612 717/125 |
| 8,645,912 | B2* | 2/2014 | Welchman | G06F 3/0481 715/704 |
| 8,751,871 | B2* | 6/2014 | Armstrong | G06F 11/0793 714/37 |
| 9,098,635 | B2* | 8/2015 | Peri-Glass | G06F 11/3688 |
| 2011/0310041 | A1 | 12/2011 | Williams et al. | |
| 2014/0173567 | A1* | 6/2014 | Krauss | G06F 11/3664 717/125 |
| 2016/0259651 | A1 | 9/2016 | Nychis et al. | |
| 2016/0259653 | A1* | 9/2016 | Nychis | G06F 11/3612 |
| 2016/0259654 | A1* | 9/2016 | Nychis | G06F 9/45508 |
| 2016/0259655 | A1* | 9/2016 | Nychis | G06F 3/04842 |
| 2016/0259717 | A1* | 9/2016 | Nychis | G06F 11/0706 |

* cited by examiner

FIG. 1

Select Report Type: Listing Quality and Suppressed Listings Report (NEW)

Download Listing Quality and Suppressed Listing Report to a

Select Report Format:
- ● Excel- NEW
- ○ Text

[Request Report]

FIG. 2

Search by shipment ID [ ] GO

< Previous Page 1 2 3 4 5 6 of 677 Next >

| MSKUs | Shipped | Received | Destination▾ | Status |
|---|---|---|---|---|
| 6 | 350 | 239 | ■ | CLOSED |

[Track shipment]

SYSTEMS AND METHODS FOR DETECTING ANOMALIES IN EXECUTION OF COMPUTER PROGRAMS

CROSS-REFERENCE TO RELATED APPLICATIONS

This application claims the benefit under 35 U.S.C. § 119(e) of U.S. Provisional Application Ser. No. 62/500,048, entitled "IDENTIFYING SIGNIFICANT VARIABLES IN SOFTWARE ROBOT COMPUTER PROGRAMS" filed on May 2, 2017, and U.S. Provisional Application Ser. No. 62/561,139, entitled "SYSTEMS AND METHODS FOR DETECTING ANOMALIES IN EXECUTION OF COMPUTER PROGRAMS" filed on Sep. 20, 2017, each of which is herein incorporated by reference in its entirety.

FIELD

Aspects of the technology described herein relate to techniques for detecting anomalies in the execution of computer programs such as automation systems.

BACKGROUND

Automation systems are computer programs configured to programmatically control one or more other computer programs (e.g., one or more application programs and/or one or more operating systems) to perform one or more tasks at least in part via the graphical user interfaces (GUIs) and/or application programming interfaces (APIs) of the other computer programs. A task may be, for example, a sequence of one or more actions (e.g., buttons clicks and/or keystrokes) that culminates in an objective being completed such as resetting a password or creating a document.

SUMMARY

According to at least one aspect, a system is provided. The system comprises at least one hardware processor; and at least one non-transitory computer-readable storage medium storing processor executable instructions that, when executed by the at least one hardware processor, cause the at least one hardware processor to perform: monitoring execution of a first computer program configured to control a second computer program to perform a task at least in part by controlling the second computer program, through a graphical user interface (GUI) and/or an application programming interface (API) for the second computer program, to perform at least one action in furtherance of the task; detecting at least one anomaly in the execution of the first computer program; and outputting the detected at least one anomaly in the execution of the first computer program.

In some embodiments, the first computer program is configured to control the second computer program through the GUI. In some embodiments, controlling the second computer program through the GUI comprises emulating an action through the GUI and wherein the action is a keystroke or a mouse click. In some embodiments, the at least one anomaly comprises failure of the emulated action through the GUI of the second computer program.

In some embodiments, the first computer program is configured to control the second computer program through the API. In some embodiments, the at least one anomaly comprises failure of at least one command issued through the API to the second computer program.

In some embodiments, detecting the at least one anomaly in the execution of the first computer program comprises detecting a change in the second computer program being controlled by the first computer program. In some embodiments, detecting the change in the second computer program comprises detecting an anomaly in a value output by the second computer program. In some embodiments, detecting the change in the second computer program comprises detecting a change in at least one element in the GUI of the second computer program. In some embodiments, detecting a change comprises detecting the removal, addition, or repositioning of at least one GUI element in the GUI of the second computer program. In some embodiments, detecting the change to the at least one element in the GUI of the second computer program comprises detecting a change in a function of the at least one element in the GUI.

In some embodiments, monitoring the execution of the first computer program comprises receiving program state information during execution of the first computer program indicative of a state of the first computer program and/or the second computer program being controlled by the first computer program. In some embodiments, detecting the at least one anomaly in the execution of the first computer program comprises: determining, using at least one validator, whether the program state information complies with one or more rules; and identifying an anomaly in the execution of the first computer program responsive to the program state information not complying with the one or more rules. In some embodiments, determining whether the program state information complies with the one or more rules comprises providing an input generated based on the program state information to a trained model to obtain an output indicative of whether the program state information complies with the one or more rules.

In some embodiments, receiving the program state information comprises receiving information indicative of a selector string to be employed by the first computer program in controlling an element of the GUI, the selector string comprising information that identifies the element within the GUI. In some embodiments, determining whether the program state information complies with one or more rules comprises determining whether at least one feature of the selector string contains an anomaly. In some embodiments, the at least one feature comprises a feature selected from the group consisting of: an X coordinate of the element within the GUI, a Y coordinate of the element within the GUI, a width of the element, a height of the element, text in the element, a name of the element, a type of the element, a permission of the element, and a position of the element relative to another element in the GUI.

In some embodiments, outputting the detected at least one anomaly comprises adding an anomaly event to a log file. In some embodiments, outputting the detected at least one anomaly comprises: identifying a number of anomaly events in the log file; and stopping execution of the first computer program and/or the second computer program responsive to the number of anomaly events in the log file exceeding a threshold.

In some embodiments, outputting the detected at least one anomaly comprises sending an electronic communication comprising an indication of the detected at least one anomaly.

According to at least one aspect, a method, performed by a computing device, is provided. The method comprises monitoring execution of a first computer program configured to control a second computer program to perform a task at least in part by controlling the second computer program, through a graphical user interface (GUI) and/or an application programming interface (API) for the second computer program, to perform at least one action in furtherance of the task; detecting at least one anomaly in the execution of the first computer program; and outputting the detected at least one anomaly in the execution of the first computer program.

According to at least one aspect, at least one non-transitory computer-readable storage medium storing processor-executable instructions is provided. The processor-executable instructions, when executed by at least one processor, cause the at least one processor to perform: monitoring execution of a first computer program configured to control a second computer program to perform a task at least in part by controlling the second computer program, through a graphical user interface (GUI) and/or an application programming interface (API) for the second computer program, to perform at least one action in furtherance of the task; detecting at least one anomaly in the execution of the first computer program; and outputting the detected at least one anomaly in the execution of the first computer program.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

As mentioned above, an automation system may be, for example, computer programs configured to programmatically control one or more other computer programs (e.g., one or more application programs and/or one or more operating systems) to perform one or more tasks at least in part via the graphical user interfaces (GUIs) and/or application programming interfaces (APIs) of the other computer programs. An automation system may perform one or more tasks to complete a higher-level process such as updating a user account, resetting a password, generating a purchase order, backing up data, and paying an invoice. Automation systems are sometimes referred to as "software robots" and/or "software robot computer programs." Some aspects of automation systems are described in U.S. Patent Publication No. 2016-0259651, titled "SOFTWARE ROBOTS FOR PROGRAMMATICALLY CONTROLLING COMPUTER PROGRAMS TO PERFORM TASKS," published on Sep. 8, 2016, which is incorporated herein by reference in its entirety.

Automation systems may be employed to, for example, emulate processes traditionally performed manually on a computer system by a human user and offer improved efficiency, reliability, cost, and transparency relative to the human user. The inventors, however, have appreciated that conventional automation systems fail to develop an intuition about the underlying process being performed unlike human users. For example, the human users may develop an objective baseline for what is normal and, thus, quickly identify any deviations from the baseline. For illustration, a human user may see the same GUI screens repeatedly while performing a process and, thus, grow familiar with the layout and content of the GUI screens. Accordingly, the human user may immediately notice if a GUI screen has been changed in some respect (e.g., an icon is removed or added).

These conventional automation systems may be coded to perform a process based on a set of underlying assumptions, such as the input data always being correct, the application being controlled not changing, and the application always executing properly. These underlying assumptions, however, are not always true. For example, a value in a field displayed in a GUI screen may be erroneous, such as a price for a particular product that is off by an order of magnitude because of an extra "0." In this example, a conventional automation system may blindly propagate the typographical error until an individual notices the error. In another example, a developer team responsible for the computer program being controlled by the automation system may provide an update that modifies the computer program. Such modifications may adversely impact the operation of the automation system by, for example, modifying portions of a GUI and/or API used by the automation system to interact with the computer program. Examples of such modifications include, but are not limited to, removing a button in a GUI, changing a function of a button in a GUI, removing a field from a GUI, adding a field to a GUI, adding one or more GUI elements to the GUI, removing one or more GUI elements from the GUI, repositioning one or more GUI elements within the GUI, and removing a command from an API. As a result, the automation system may be left non-functional (e.g., attempting to click a button that doesn't exist) and/or executing improperly (e.g., clicking on an incorrect button) because of the update.

As a result of these anomalies in execution of the automation system, conventional automation systems may spend a considerable amount of time in a non-functional state or executing improperly. For example, an automation system may continuously propagate a typographical error in a field until a human user notices the error being propagated. Then, the source of the error needs to be manually identified and corrected in addition to all of the affected files (or other output) generated by the automation system (while propagating the typographical error). Thus, conventional automation systems may only be properly executing a process for a fraction of the total time executed on a computer system.

Accordingly, aspects of the present disclosure relate to a computer program for detecting anomalies in the execution of another computer program (referred to herein as a "correctness engine") such as an automation system. The detected anomalies may be, in turn, output to the appropriate individuals (e.g., a software engineer responsible for the computer program) to enable rapid intervention. Additionally or alternatively, the execution of the computer program may be temporarily paused, stopped altogether, or otherwise changed in response to detection of an anomaly to eliminate (or otherwise reduce) any adverse impact caused by the anomaly. Thus, the correctness engine may account for anomalies in execution that, for example, violate one or more underlying assumptions made in the development of the computer program, such as the input data always being correct and/or transitions always occurring properly. Such techniques represent an improvement in existing computer technology at least because these techniques substantially reduce the error rate of computer programs by catching any errors in execution expediently and modifying execution as appropriate. By automatically catching errors during execution and mitigating the negative consequences, the overall performance of any computer program is substantially improved (e.g., invalid or otherwise erroneous computer program executions are reduced). Further, the reduction of erroneous computer program executions directly reduces unnecessary utilization of computer resources including memory, bandwidth, and processor resources.

In some embodiments, the correctness engine may be implemented as a computer program configured to monitor execution of a first computer program that controls a second, different computer program. In these embodiments, the correctness engine may integrated with the first computer program so as to form a single computer program or implemented as a separate and distinct computer program that communicates with the first computer program. The first computer program may be, for example, an automation system. The correctness engine may detect any of a variety of anomalies in the execution of the first computer program. For example, the correctness engine may detect any one or combination of the following anomalies: (1) anomalies in the data obtained by the first computer program from the second computer program, such as an error in a value obtained from a GUI and/or API of the second computer program; (2) anomalies in the interface used by the first computer program to control the second computer program, such as a change to a GUI element (e.g., removal of a button) in a GUI of the second computer program and/or a change to an API (e.g., removal of a command from) of the second computer program; and (3) anomalies in the operation(s) performed by the second computer program in response to receiving a command via an API and/or a GUI, such as a change in which GUI screen is displayed responsive to a button being clicked.

The correctness engine may be implemented on, for example, a system that comprises at least one hardware processor and at least one non-transitory computer-readable storage medium storing processor executable instructions that, when executed by the at least one hardware processor, cause the at least one hardware processor to perform one or more functions to detect anomalies in the execution of a computer program. In some embodiments, the instructions may cause the hardware processor to monitor execution of a first computer program that is configured to control a second computer program. For example, the first computer program may be an automation system that is configured to control another application (e.g., an Internet web browser).

The first computer program may control the second computer program in any of a variety of ways. For example, the second computer program may comprise a GUI and the first computer program may control the second computer program using the GUI (e.g., by emulating actions in the GUI). Additionally (or alternatively), the second computer program may comprise an API and the first computer program may control the second computer program using the API (e.g., by sending commands to the API).

The first computer program may control the second computer program to, for example, perform a task. A task may be, for example, a sequence of one or more actions that culminates in an objective being completed such as resetting a password. The actions may be, for example, mouse-clicks and/or keystrokes in a GUI. Thereby, the first computer program may control the second computer program to perform a task at least in part by controlling the second computer program to perform an action in furtherance of the task (e.g., an action in the sequence of actions associated with the task).

In some embodiments, the instructions may cause the hardware processor to detect an anomaly in the execution of the first computer program. The anomaly may be, for example, an unexpected, unanticipated, and/or unwanted event that occurs during execution of the first computer program. Example anomalies in the context of an automation system include unexpected changes to the computer program being controlled and/or erroneous input data obtained from the computer program being controlled that impacts the operation of the automation system. For example, an emulated action in the GUI of the second computer program (e.g., an emulated mouse-click) may fail because a field has been removed from the GUI. In another example, a command to an API of the second computer program may fail because the API has been modified.

The anomalies may be detected using any of a variety of techniques. In some embodiments, an anomaly is detected using program state information collected during execution of the first computer program indicative of a state of the first computer program and/or the second computer program. The program state information may comprise, for example, information regarding the state of a GUI of the second computer program. In these embodiments, the state information may be employed (directly or indirectly) by at least one validator to determine whether the state information complies with one or more rules. The rules to which the validator compares the program state information may define, for example, the expected program state information given one or more actions having been performed (e.g., an expected state of the GUI of the computer program after a button is clicked). An anomaly may be detected responsive to the program state information not complying with the one or more rules.

In some embodiments, the instructions may cause the hardware processor to output the detected anomaly. The detected anomaly may be output in any of a variety of ways. For example, the detected anomaly may be written to a log file and/or send an electronic communication (e.g., an email) comprising an indication of the detected at least one anomaly. Additionally (or alternatively), the detected anomaly may be employed to determine whether execution of the first computer program should be stopped. For example, execution of the first computer program may be stopped responsive to a number of detected anomalies written in a log file exceeding a threshold. In another example, the execution of the first computer program may be stopped responsive to detecting a particular (e.g., serious) anomaly.

As discussed above, the correctness engine may employ one or more validators that detect anomalies in the execution of a computer program. These validators may detect anomalies by, for example, comparing program state information collected during execution of the computer program to a set of rules that describe the expected program state information. Validators may be created that validate various aspects of the execution of the computer program. In some embodiments, a validator may be employed to validate selector strings (referred to herein as a "selector string validator"). A selector string may be, for example, a sequence of characters that identifies an element (e.g., button, input field) within a GUI of a computer program. Selector strings may be employed by a computer program (e.g., an automation system) to control another computer program (e.g., a web browser) using the GUI of the other computer program.

The selector string validator may be implemented as, for example, a system that comprises at least one hardware processor and at least one non-transitory computer-readable storage medium storing processor executable instructions that, when executed by the at least one hardware processor, cause the at least one hardware processor to perform one or more functions to, for example, validate selector strings.

In some embodiments, the instructions may cause the hardware processor to identify a selector string to employ in controlling an element of a GUI of a computer program. For example, a selector string that is about to be employed by an automation system to control the other computer program may be identified. The selector string may comprise, for example, information that identifies the element within the GUI of the computer program.

In some embodiments, the instructions may cause the hardware processor to validate the selector string at least in part by determining whether some of the properties of GUI elements identified by a selector string are anomalous. The anomaly may be detected in any of a variety of ways including, for example, using one or more trained models (e.g., trained statistical models). Example anomalies include a change to any one or more of the following: an X coordinate of the element within the GUI, a Y coordinate of the element within the GUI, a width of the element, a height of the element, text in the element, a name of the element, a type of the element, a permission of the element, and a position of the element relative to another element in the GUI.

In some embodiments, the instructions may cause the hardware processor to use the selector string to control the element within the GUI of the computer program responsive to determining that the selector string does not contain the anomaly. For example, the automation system may proceed to use the selector string to control the GUI of another computer program. If a determination is made the that the some of the properties of GUI elements identified by a selector string are anomalous, information indicative of the detected anomaly may be output.

The aspects and embodiments described above, as well as additional aspects and embodiments, are described further below. These aspects and/or embodiments may be used individually, all together, or in any combination of two or more, as the application is not limited in this respect.

Example Anomalies

As discussed above, aspects of the present disclosure relate to techniques to detect anomalies in the execution of an automation system configured to control another computer program. Any of a variety of anomalies may occur during the execution of an automation system. In some instances, an anomaly may occur in the input data obtained by the automation system from the computer program being controlled. The input data obtained from the automation system may be, for example, in the incorrect format (e.g., characters are present in a field that should only have numbers), incomplete (e.g., a required field is empty), and/or erroneous (e.g., the value is incorrect). Such anomalies may occur for various reasons. For example, a human user may inadvertently enter a value incorrectly into a computer program and the computer program may, in turn, later output the erroneous value to the automation system.

In some instances, an error in the input format of data obtained by the automation system from another computer program may be caused by changes in the way the computer program outputs data. For example, the automation system may have been constructed to read information from each column in Table 1 below output by the computer program.

TABLE 1

| Sample Table | | |
| --- | --- | --- |
| Name | Price | Quantity |
| Product 1 | 1000 | 10 |
| Product 2 | 5 | 500 |

As shown, the automation system may be designed to expect information regarding a product name in the first column, information regarding product price in the second column, and information regarding product quantity in the third column. Accordingly, a change to computer program that swaps the positions of the columns as shown in Table 2 below may adversely impact the automation system.

TABLE 2

| Columns Swapped in Sample Table | | |
| --- | --- | --- |
| Name | Quantity | Price |
| Product 1 | 10 | 1000 |
| Product 2 | 500 | 5 |

An automation system designed to expect information in the format of Table 1 that receives information in the format of Table 2 may inadvertently process product quantity information as product price information and process product price information as product quantity information. Similarly, adding another column to the table as shown in Table 3 below may adversely impact the automation system.

TABLE 3

| Column Added to Sample Table | | | |
| --- | --- | --- | --- |
| Name | Price | Number of Sellers | Quantity |
| Product 1 | 1000 | 2 | 10 |
| Product 2 | 5 | 5 | 500 |

An automation system designed to expect information in the format of Table 1 that receives information in the format of Table 3 may inadvertently process a number of sellers as product quantity information and miss the true product quantity information altogether.

Anomalies in the execution of the automation system may arise separate and apart from anomalies in the data obtained by the automation system. In some instances, anomalies may occur in the interface of a computer program used by the automation system to control the computer program, such as a GUI and/or an API of the computer program. These anomalies in the interface of the computer program may be caused by updates to the computer program that are not communicated to the software engineers maintaining the automation system. For example, a GUI may be updated to make the GUI easier for humans to interact with. However, a simple GUI change such as moving a button may cause an action performed by the automation system to fail (e.g., the automation system may attempt to click on the button and misses). Further, changes to a GUI may interfere with operation of an automation system without any of the changes being visible to a human user. For example, changes in the internal HTML structure of a webpage may negatively impact the operation of an automation system without there being any visible change to the GUI.

Figure 1:
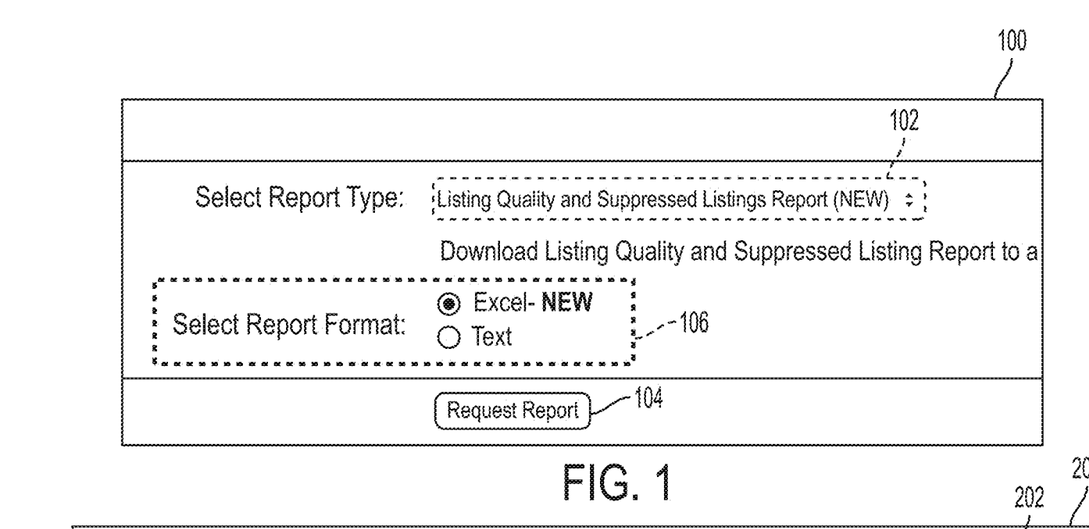
FIG. 1 is a diagram of a screen that shows an example anomaly, according to some embodiments of the technology described herein.

FIG. 1 is an example diagram of an anomaly in a screen 100 for a computer program being controlled by an automation system. As shown, the screen 100 includes report type dropdown menu 102 where a particular report may be selected and a request report button 104 to download a file containing the selected report. In a previous version of the screen 100, the selected report could only be downloaded as a text file. However, as shown, the screen 100 has a new section that includes a report format radio button 106 that permits a user to select the particular file format the selected report. Further, the default position of the report format radio button 106 is an EXCEL format instead of a text format. Thus, an automation system configured to simply select a particular report in the report type dropdown menu 102 and click the request report button 104 would expect a text file to be download and, instead, receive an EXCEL file. As a result, any subsequent operations performed on the downloaded report may fail because of the different format of the downloaded file.

In some instances, anomalies may occur in the operation(s) performed by the computer program being controlled by the automation system in response to receiving a command via an API and/or a GUI. For example, the automation system may command the computer program to perform a specific operation and the computer program may, in response to receipt of the command, perform a different operation. In another example, the computer program may simply fail to perform the operations associated with a command. Thus, the automation system may assume that the operations associated with a given command have been performed despite the computer program not performing those operations.

Figure 2:
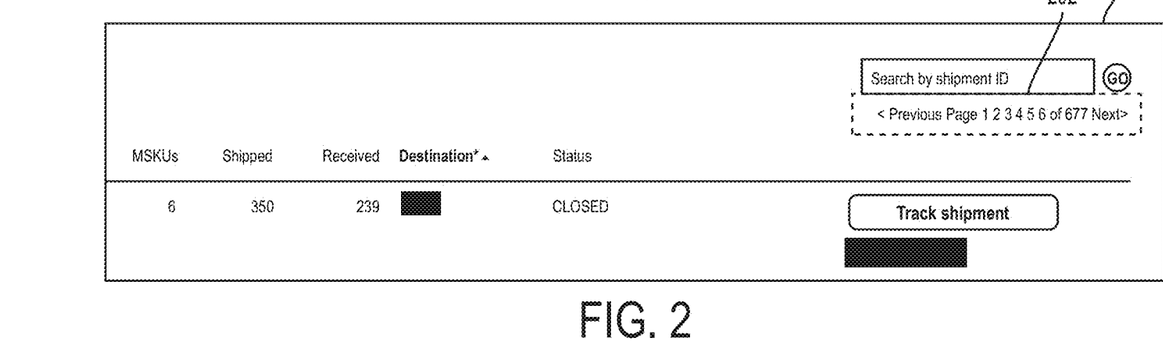
FIG. 2 is a diagram of a screen that shows an example anomaly in a screen transition, according to some embodiments of the technology described herein.

FIG. 2 is example diagram of a screen 200 for a computer program being controlled by an automation system. As shown, the screen 200 comprises a page navigator 202 that may be employed to navigate to different pages within the interface. An automation system that interacts with this screen 200 may, for example, obtain the information from a given page and click the "Next" button in the page navigator 202 assuming that the interface has transitioned to the next page. However, the "Next" button in the page navigator 202 may occasionally fail. For example, the computer program may not transition the page in response to receipt of a click on the page navigator 202. Thus, the automation system may end up obtaining the same information multiple times thinking that the information originated from different pages when the information in-fact originated from the same page.

Example Systems for Detecting Anomalies

Figure 3:
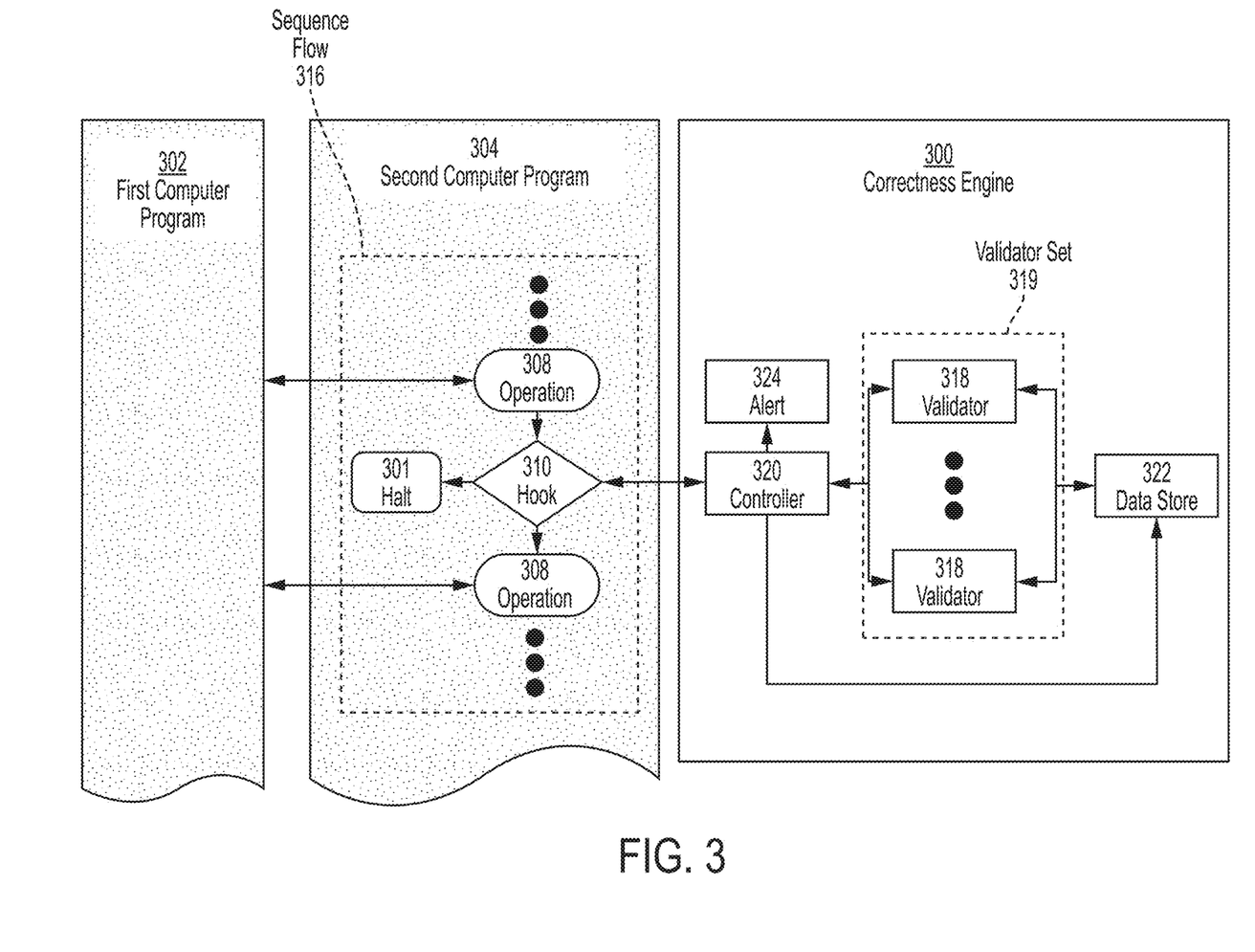
FIG. 3 is a diagram of an example correctness engine for detecting anomalies in the execution of a computer program, according to some embodiments of the technology described herein.

FIG. 3 shows an example correctness engine 300 for detecting anomalies in execution of another computer program. As shown, a first computer program 302 is being controlled by a second computer program 304 that is being monitored by the correctness engine 300. The second computer program 304 may be configured to control the first computer program 302 by performing one or more operations 308 in a sequence flow 316. The sequence flow 316 may include hooks 310 that trigger the correctness engine 300 to validate one or more aspects of the execution of the second computer program 304. The correctness engine 300 may validate one or more aspects of the execution of the second computer program 304 via a controller 320 that provides the appropriate information to one or more validators 318 in a validator set 319. Each of the validators 318 may comprise, for example, a trained model (e.g., a trained machine learning model and/or a trained statistical model) that is configured to provide an output indicative of whether the input data complies with the one or more rules. The controller 320 may receive the outputs from the validators 318 and, based on the outputs from the validators 318, determine whether an anomaly has occurred in the execution of the second computer program 304.

The first computer program 302 may comprise an interface that permits the first computer program 302 to be controlled by the second computer program 304. For example, the first computer program 302 may comprise a GUI that may be manipulated by the second computer program 304 and/or an API through which the second computer program 304 can issue commands to the first computer program 302. It should be appreciated that the first computer program 302 may be implemented to perform any of a variety of functions.

The second computer program 304 may be implemented as, for example, an automation system that is configured to control the operation of the first computer program 302 to perform at least one task. The second computer program 304 may, for example, perform a sequence flow 316 comprising one or more operations 308 to control the first computer program 302. The operations 308 may be, for example, operations that control the first computer program 302, such as clicking a button in a GUI of the first computer program 302, and/or operations that obtain information from the first computer program 302, such as reading a field displayed in the GUI of the first computer program 302.

As shown, one or more hooks 310 may be added to the sequence flow 316 to validate one or more aspects of the execution of the second computer program 304. For example, the hooks 310 may send program state information regarding first and/or second computer programs 302 and 304, respectively, to the correctness engine 300 for validation. The program state information may be, for example, information indicative of a current operational state of a computer program such as information output by the computer program, information received by the computer program, and/or a detected response to at last one command (e.g., a GUI click and/or a command sent via an API). Example program state information comprises screenshots of a GUI, an indication of a format of a file, an output from an API in response to a command, and/or changes to values of one or more variables in the second computer program 304.

The hook 310 may, for example, trigger the second computer program 304 to wait (e.g., stop performing additional operations) until the program state information is validated by the correctness engine 300. The hook 310 may, in response to sending the program state information to the correctness engine 300, receive an indication of what action to take (e.g., stop execution, skip to a later operation, continue operation, etc.) and/or an indication of whether an anomaly has occurred in the execution of the second computer program 304. For example, if the hook 310 receives an indication that an anomaly has not occurred in the execution of the second computer program 304, the hook 310 may permit the second computer program 304 to proceed to the next operation 308 in the sequence flow 316 to continue operating. Otherwise, the hook 310 may cause the second computer program 304 to perform one or more operations to minimize the impact of the detected anomaly.

The operations performed by the second computer program 304 upon detection of an anomaly may be, for example, included in a communication from the correctness engine 300 and/or coded within the second computer program 304. The particular operations performed may depend on, for example, the particular anomaly detected. For example, the second computer program 304 may continue executing in response to certain non-critical anomalies. In other examples, more drastic action may be performed such as causing the second computer program 304 to transition to a halted state 301 to stop execution of the sequence flow 316. The second computer program 304 may halt execution altogether or simply halt execution of a portion of the sequence flow 316 and skip to a later portion of the sequence flow (e.g., skip one problematic step in a process and continue to perform other steps in the process or another process entirely).

The correctness engine 300 may be configured to detect anomalies in the execution of the second computer program 304. The correctness engine 300 may, for example, trigger the second computer program 304 to install the hooks 310 and store the received program state information from the hooks in a data store 322. The hooks 310 may be installed via monkey patching by, for example, changing one or more function definitions in runtime so as to avoid making changes to the second computer program 304 directly. In other examples, the hooks 310 may be directly coded into the second computer program 304. Once a sufficient amount of program state information has been received for valid executions, the correctness engine 300 may create one or more validators 318 using the stored program state information. For example, the correctness engine 300 may train a model (e.g., a support vector machine (SVM) or a neural network) using the program state information such that the trained model can discern whether new program state information complies with one or more rules (e.g., extracted from the program state associated with valid executions). The model may be trained using, for example, machine learning techniques such as supervised machine learning techniques and/or unsupervised machine learning techniques.

Once the correctness engine 300 has created the validators 318, the controller 320 may route received program state information received from the second computer program 304 to one or more validators 318 in the validator set 319 based on, for example, the particular hook 310 that triggered the program state information to be sent and/or the composition of the program state information. The controller 320 may then obtain an output from the validators 318 and determine whether one or more anomalies occurred in the execution of the second computer program 304 based on the output from the validators 318. For example, the controller 320 may employ a voting system to determine whether one or more anomalies occurred where a minimum threshold number of validators must provide an output indicative of the program state information not complying with one or more rules before an anomaly is detected. Additionally (or alternatively), a weighting factor may be applied to the output of one or more validators so as to trust the output of some validators more than others (e.g., some validators may trigger detection of an anomaly alone while others may not). Such systems may advantageously reduce the likelihood of false positives. In another example, the controller 320 may determine that one or more anomalies occurred in the execution of the second computer program 304 responsive to the output of any one of the validators 308.

Once the controller 320 has determined whether an anomaly has occurred, the controller 320 may send one or more messages to the second computer program 304. For example, the controller 320 may send a message to the second computer program 304 to continue execution in response to no anomaly being detected. Otherwise, the controller 320 may send a message to the second computer program 304 including, for example, an indication that an anomaly was detected and/or information regarding one or more operations to perform (e.g., to halt execution). The controller 320 may trigger the second computer program 304 to halt execution in response to detecting a single anomaly or, in some instances, detecting a minimum number of anomalies (e.g., at least 5 anomalies). In cases where an anomaly is detected, the controller 320 may additionally output an alert 324 indicating that an anomaly was detected. The alert 324 may be transmitted to, for example, one or more individuals responsible for maintaining the second computer program 304. The alert 324 may contain, for example, information identifying the detected anomaly to facilitate resolution of the anomaly, such as the particular hook that triggered the correctness engine 300 to detect the anomaly. Thus, a software engineer may quickly ascertain the location within the second computer program 304 that the anomaly occurred. Further, the alert 324 may be logged (e.g., in data store 322) for subsequent retrieval alongside any previously issued alerts 324.

It should be appreciated that various alterations may be made to the second computer program 304 and/or the correctness engine 300 without departing from the scope of the present disclosure. For example, the second computer program 304 may perform any number of operations 308 in controlling the first computer program 302 to perform a task, any number of hooks 310 may be integrated into the second computer program 304 to validate any of a variety of pieces of information, and the validator set 319 may comprise any number of validators. Further, any portion or all of the functions of the correctness engine 300 may be integrated with the second computer program 304.

Figure 4:
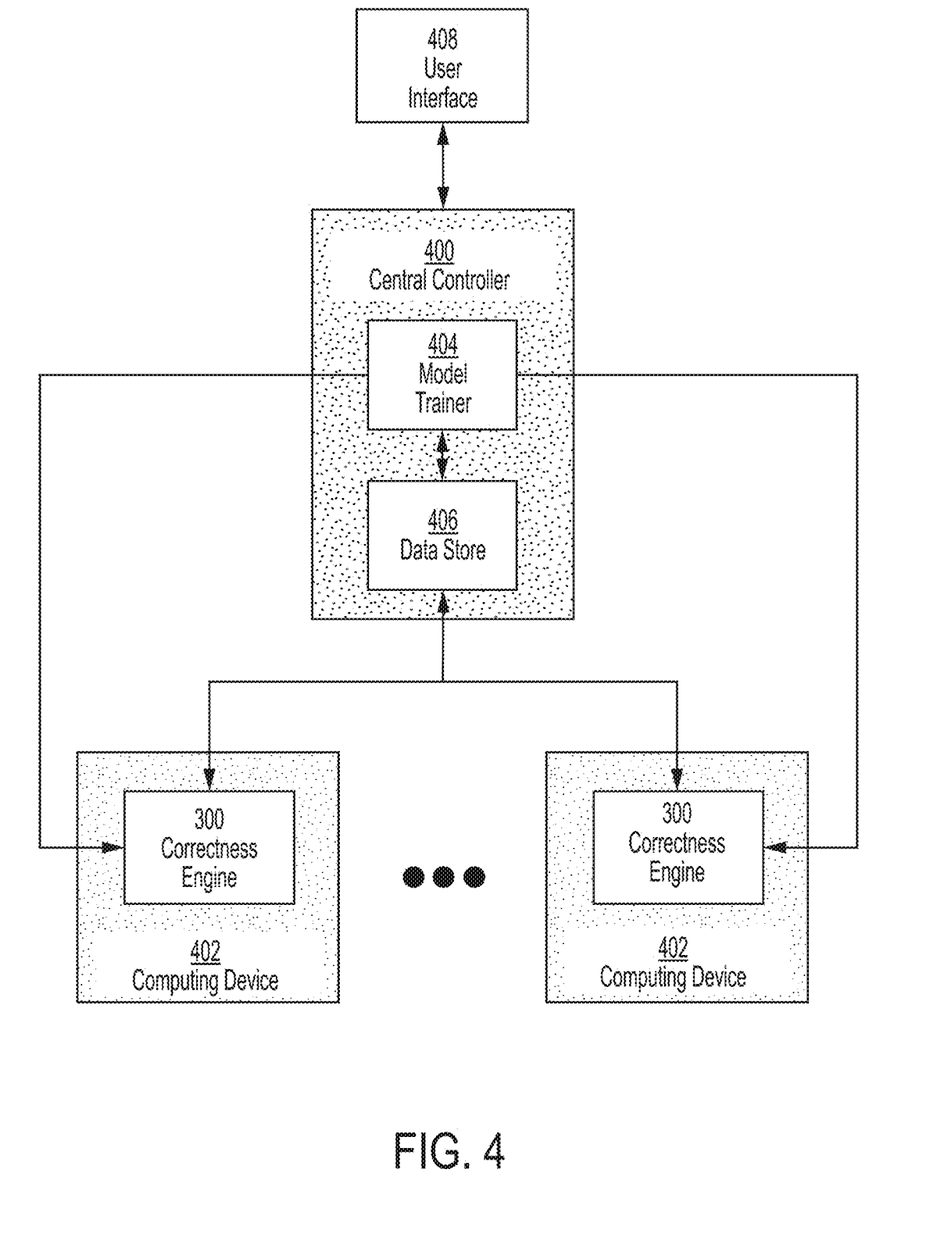
FIG. 4 is a diagram of an example system for controlling a plurality of correctness engines, according to some embodiments of the technology described herein.

In some embodiments, one or more of the operations performed by the correctness engine 300 may be offloaded to a central controller that is in communication with the correctness engine 300. Offloading operations from the correctness engine 300 may advantageously centralize some operations that would need to be performed by each correctness engine 300 in a set of correctness engines 300 such as training models for validators. An example of such a central controller is shown in FIG. 4 by central controller 400. As shown, the central controller 400 is in communication with a plurality of correctness engines 300 each executing on a different computing device 402 (e.g., in combination with the first and second computer programs 302 and 304 shown in FIG. 3). The central controller 400 may be, for example, a server executing one or more computer programs that is communication computing devices 402 each executing at least one instance of the correctness engine 300. The computing devices 402 may be physical computer systems, such as those described below with reference to FIG. 8, or virtual computer systems, such as virtual machines, that execute on a physical computer system. Thus, multiple correctness engines 300 may execute on different virtual computer systems hosted by a single physical computer system.

As shown, the central controller 400 may comprise a data store 406 that may store the program state information collected and/or the alerts generated from each of the correctness engines 300. The model training 404 may, in turn, use the program information in the data store 406 to train models (and/or retrain models) and provide the newly trained models to the correctness engines 300. The central controller 400 may provide a user interface 408 through which a user can interact with one or more of the correctness engines 300 in communication with the central controller 400.

In some embodiments, the central controller 400 may centralize the model training functionality of the correctness engine 300 described above with reference to FIG. 3. In these embodiments, the correctness engines 300 may each upload obtained program state information to a data store 406 in the central controller 400. For example, the correctness engines 300 may store the obtained program state information in a local data store (e.g., data store 322) and periodically (or aperiodically) upload the obtained program state information to the data store 406. Once a threshold amount of program state information has been obtained (e.g., program state information for a minimum number of successful iterations of a process have been collected), the central controller 400 may trigger a model trainer 404 to train a model based on the program state information. For example, the model training 404 may train a model using the program state information such that the trained model can discern whether new program state information complies with one or more rules (e.g., extracted from the program state information associated with valid executions). The model may be trained using, for example, machine learning techniques such as supervised machine learning techniques and/or unsupervised machine learning techniques.

The model trainer 404 may, in some embodiments, periodically (or aperiodically) retrain the models as new program state information is received in the data store 406. For example, the central controller 400 may retrain the models in accordance with a schedule. In another example, the central controller 400 may retrain a model in response to one or more detected events, such as a human user notifying the central controller 400 that an output anomaly was a false positive. Thus, the central controller 400 may retrain the model(s) that incorrectly identified an anomaly.

Once the model trainer 404 has generated a trained model (or a retrained model), the trained model (along with any relevant metadata) may be stored in the data store 406 and/or output to the correctness engines 300. The correctness engines 300 may, in turn, integrate the newly trained model into a validator. The correctness engines 300 may store the trained model in a local data store. The correctness engine 300 may, in turn, retrieve these trained models stored in the local data store and load them into a Random Access Memory (RAM) of the computer device 402 upon initialization to advantageously reduce the amount of time required to obtain an output from the trained models during anomaly detection. Further, the correctness engines 300 may check the validity of the trained models stored in the local data store upon initialization to see if a new trained model is needed. For example, the correctness engine 300 may send a request to the central controller 400 for a new trained model in response to detecting that the local trained models are invalid. The message may trigger the central controller 400 to provide the correctness engine 300 a newer version of the trained model from the data store 406 and/or to generate a new trained model.

The central controller 400 may provide a user interface 408 that permits a user to directly control one or more aspects of the operation of the central controller 400 and/or the correctness engines 300. For example, the user interface 408 may be a GUI that displays a dashboard which permits a user to: (1) enable or disable different hooks in the correctness engines 300; (2) enable or disable different validators in the correctness engines 300; (3) see the detected anomalies from one or more correctness engines 300; (4) label detected anomalies as false alarms; (5) instruct correctness engines 300 to trigger the computer program being monitored to continue execution; (6) trigger the model trainer 404 to retrain a model; and/or (7) check a status of one or more trained models.

Example Validators

As discussed above, validators may be constructed that determine whether program state information complies with one or more rules. These validators may be configured to analyze any of a variety of program state information depending on, for example, the particular anomaly to be detected. Example validators include any one or more of the following:

Visual Feature Validator—This validator may be configured to detect anomalies in GUI screens of a computer program such as the addition or removal of buttons. The validator may receive a GUI screenshot as an input and provide an indication of whether the GUI screenshot is sufficiently similar to previously captured GUI screenshots during a valid execution.

Visual Sequence Validation—This validator may be configured to detect anomalies in a sequence of GUI screens of a computer program such as changes in transitions between GUI screens (e.g., changes to the destination page associated with a button press). The validator may receive a sequence of GUI screenshots as an input and provide an output indicative of whether the sequence of GUI screenshots is sufficiently similar to previously captured sequence of GUI screenshots during a valid execution of the computer program.

Function Call Flow Validator—This validator may be configured to detect anomalies in function calls made by a computer program. The validator may receive, for example, information regarding the performance of a function call such as the time taken for completion, input parameters, return values, and sequence number (e.g., where in the sequence of operations in the computer program was the function called) as an input and provide an output indicative of whether the function call was executed in a sufficiently similar way to previous function calls performed during a valid execution of the computer program.

Significant Variables Validator—This validator may be configured to detect anomalies in input data received by the computer program and/or output data generated by the computer program. The validator may, for example, receive a value from a particular field as an input and provide an indication of whether the values is sufficiently similar way to previous values captured during a valid execution of the computer program.

Input File Validator—This validator may be configured to detect anomalies in files accessed by the computer program, such as anomalies in the file type (e.g., an EXCEL file was expected by a WORD file was received). The validator may, for example, receive as input one or more properties of a file such as its source, extension type, data format, and/or name and provide an indication of whether the file is sufficiently similar way to files received during a valid execution of the computer program.

System Health Validator—This validator may be configured to detect anomalies in the system health of the computing device on which the computer program is executing. The validator may, for example, receive as input one or more system health parameters such as processor usage, memory usage, disk usages, and/or network usage and provide an indication of whether the system health parameters are sufficiently similar to system health parameters captured during a valid execution of the computer program.

It should be appreciated that still yet other validators may be created. In some embodiments, the correctness engines described herein may include a validator that is constructed to validate one or more aspects of a selector string used by an automation system to control another application. A selector string may be, for example, a sequence of characters that identifies the desired element (e.g., button, input field) within a GUI of the application being controlled. An automation system may use selector strings to interact with these elements. Anomalies that impact the selector strings may directly impact the automation system's ability to interact with another computer program. Accordingly, validators may be designed to monitor one or more aspects of the operation of the selector strings such as a selector string feature validator and/or a selector string sequence validator.

The selector string feature validator may be configured to validate one or more features within a selector string for an element. Example features associated with an element include: (1) X and Y coordinates of the element; (2) height and width of the element; (3) text inside the element; (4) name and type (e.g. button, checkbox, etc.) of the element; (5) whether the element is enabled, selected, displayed, editable and/or checked; (6) position of element relative to its parent and sibling elements; and/or (7) optional properties (e.g., optional properties specified in HTML specification such as 'href', 'onclick', etc.). The validator may, for example, receive as input one or more features from a selector string and provide an indication of whether the features are sufficiently similar to features for the same selector string captured during a valid execution of the computer program. For example, the features associated with a selection string for a GUI button may include a name of the button, a position of the button, and/or text displayed on the button. A selector string for such a GUI button may appear as "<name: "button", x-coord: 10, y-coord: 30, text: "submit">" and a set of valid executions using the selecting string may appear as follows:

1. selector_string_1: <name: "button", x-coord: 10, y-coord: 30, text: "submit">
2. selector_string_1: <name: "button", x-coord: 11, y-coord: 30, text: "submit">
3. selector_string_1: <name: "button", x-coord: 09, y-coord: 30, text: "submit">

As shown, the location of the button remains mostly unchanged run-to-run while the text of the button remains identical. Such a pattern may be inferred by a model trained using a set of valid runs. Thus, the trained model would detect an anomaly in the following selector string:

1. selector_string_1: <name: "button", x-coord: 40, y-coord: 100, text: "delete">

As shown, the anomalous selection string contains both a change to the text from "submit" to "delete" and a substantially change to the x and y coordinates from approximately 10 and 30, respectively, to 40 and 100, respectively.

The selector string sequence validator may be configured to validate the sequence in which selector strings are executed. The validator may, for example, receive as input a sequence of one or more selector strings executed and provide an indication of whether the sequence of one or more selector strings are sufficiently similar to sequence of one or more selector strings captured during a valid execution of the computer program. Example selector string sequences for a valid execution and an anomalous execution are shown below in Table 4.

TABLE 4

| Sequence Number | Selector String during Valid Execution | Selection String during Anomalous Execution |
| --- | --- | --- |
| 1 | selector_string_1 | selector_string_3 |
| 2 | selector_string_1 | selector_string_3 |
| 3 | selector_string_1 | selector_string_3 |
| 4 | selector_string_2 | selector_string_2 |
| 5 | selector_string_3 | selector_string_1 |
| 6 | selector_string_2 | selector_string_2 |
| 7 | selector_string_3 | selector_string_1 |

As shown in Table 4, the sequence of selector string execution may be anomalous while the individual selection strings may appear valid (e.g., to a selector string feature validator). Thus, the selector string sequence validator may be advantageously employed in combination with the selector string feature validator to accurately detect a wide range of anomalies involving selector strings.

Example Methods for Detecting Anomalies

Figure 5:
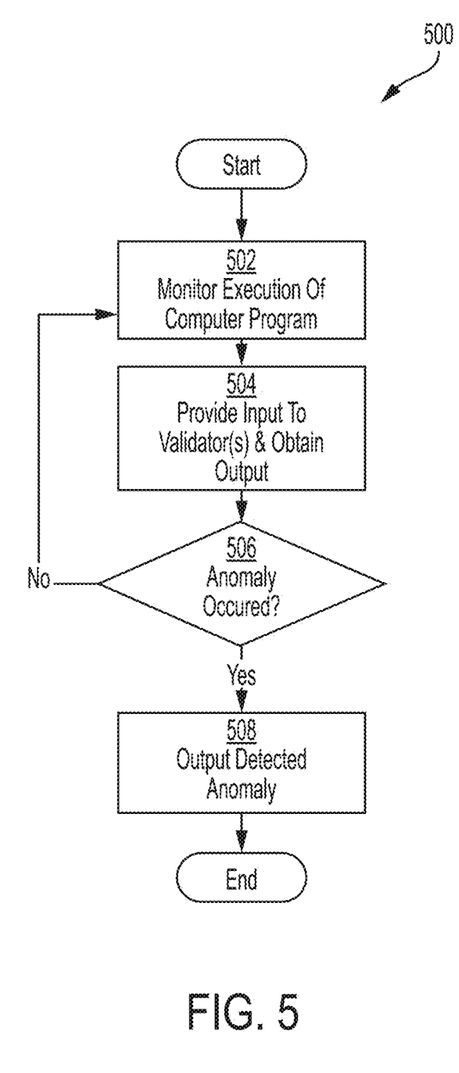
FIG. 5 is a flowchart of an example process for detecting an anomaly in the execution of a computer program, according to some embodiments of the technology described herein.

FIG. 5 is a diagram of an example process 500 for detecting an anomaly. The process may be performed by, for example, a correctness engine such as correctness engine 300 described above. As shown, the process 500 comprises an act 502 of monitoring execution of a computer program, an act 504 of providing an input to validator(s) and obtaining an output, an act 506 of determining whether an anomaly is detected, and an act 508 of outputting the detected anomaly.

In act 502, the correctness engine may monitor execution of a computer program such as an automation system. The correctness engine may monitor execution by obtaining program state information regarding a first computer program and/or a second computer program being controlled by the first computer program. The correctness engine may obtain the program state information through the use of hooks installed in the computer program being monitored. The hooks may, for example, cause the computer program to transmit program state information to the correctness engine at one or more defined points during the computer program's execution.

In act 504, the correctness engine may provide an input to one or more validators and obtain an output from the one or more validators. The validators may be configured to provide an output indicative of whether the input (e.g., the input program state information) is sufficiently similar to the data captured during valid execution of the computer program. For example, validators may comprise trained models that are configured to receive an input and determine whether the input complies with one or more rules (e.g., extracted from a training data set comprising data from multiple valid executions). The input provided to the validators may be, for example, generated based on the program state information received in act 502. For example, the program state information in act 502 may be transformed to be in a suitable format to be input into the validator (e.g., words are removed, values are scaled, etc.). The particular transformation performed may, in some implementations, exactly match the transformations performed to generate a training data set employed to train the validator. Additionally (or alternatively), any or all of the program state information obtained in act 502 may be directly input into the validator without any modification.

In act 506, the correctness engine may determine whether an anomaly has occurred in the execution of the computer program. The correctness engine may determine whether the anomaly has occurred based on the output obtained from the validators in act 504. For example, each of the validators may output a value indicative of whether input program state information complies with one or more rules. In this example, a weight may be applied to each of the output values based on the accuracy of the validator that generated the value such that the output of more accurate validators are weighted higher than the output from less accurate validators. The weighted values may be combined into an aggregate value that is compared to a threshold to determine whether an anomaly occurred (e.g., an anomaly occurred if the aggregate value is above the threshold and an anomaly has not occurred if the aggregate value is below the threshold). In another example, the correctness engine may determine that an anomaly has occurred responsive to the output of any of the validators indicating that the input program state information fails to comply with one or more rules (e.g., an anomaly occurred unless the output from all of the validators indicates the input program state information complied with the rules). In yet another example, the correctness engine may employ a voting system where the correctness engine determines that an anomaly has occurred responsive to the output from a minimum number of validators indicates that the input program state information fails to comply with one or more rules (e.g., an anomaly occurred when the output from at least three validators indicates the input program state information complied with the rules).

In some embodiments, the correctness engine may determine whether the anomaly has occurred based on a whitelist of acceptable anomalies in addition to the output obtained from the validators. The whitelist may be, for example, a list of acceptable anomalies that little or no impact on the operation of the second computer program and, thus, can be ignored. The whitelist may be created by, for example, a human user. In these embodiments, the correctness engine may first analyze the output of the validators using any of the techniques described herein to determine whether the validators detected an anomaly. If the output of validators indicated that an anomaly occurred, the correctness engine may compare the anomaly detected to determine if the anomaly matches an anomaly included in the whitelist. If the anomaly matches an anomaly on the whitelist, the correctness engine may override the output of the validators and proceed as if an anomaly did not occur.

If the correctness engine determines that an anomaly has not occurred in act 506, the correctness engine may return to act 502 to continue to monitor execution of the computer program. Otherwise, the correctness engine may proceed to act 508 and output the detected anomaly. The correctness engine may output the detected anomaly in any of a variety of ways. For example, the correctness engine may transmit a communication (e.g., send an email) to the software engineer(s) responsible for the computer program and include an indication of the detected anomaly. Additionally (or alternatively), the correctness engine may send one or more commands to the computer program to minimize the impact of the anomaly such as to stop executing and/or to skip one or more operations in the process.

Figure 6:
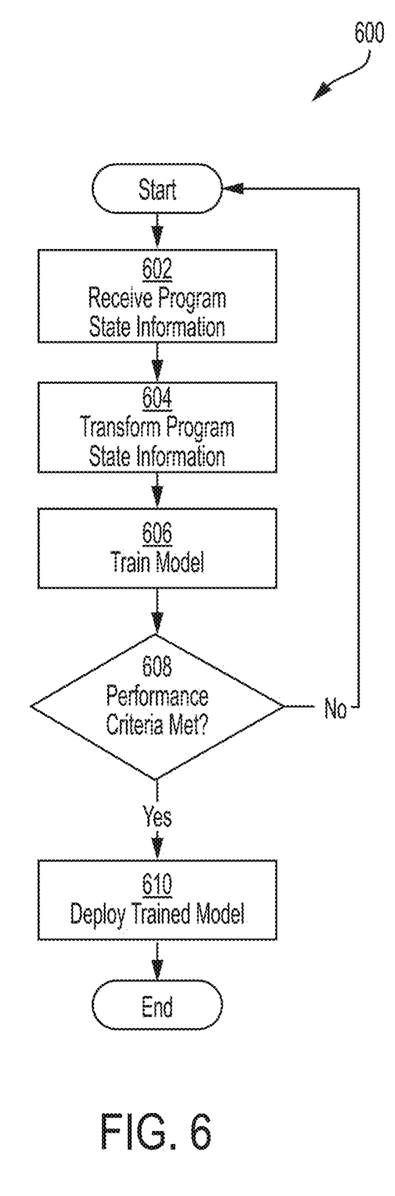
FIG. 6 is a flowchart of an example process for training a model, according to some embodiments of the technology described herein.

As discussed above, the validators may employ models that are trained using various techniques to determine whether input program state information complies with one or more rules (e.g., identified from program state information captured during valid executions). These models may be trained in any of a variety of ways. FIG. 6 shows an example process 600 for training a model. The process 600 may be performed by, for example, the correctness engine (e.g., correctness engine 300) and/or a central controller in communication with one or more correctness engines (e.g., central controller 400). As shown, the process 600 comprises an act 602 of receiving program state information, an act 604 of transforming program state information, an act 606 of training a model, and act 608 of determining whether performance criteria are met, and an act 610 of deploying the trained model.

In act 602, program state information may be received that includes at least some information captured during valid execution of one or more computer programs. The program state information may be, for example, retrieved from a data store such as data stores 322 and/or 406. The program state information may have been collected using, for example, one or more hooks integrated into the computer program.

In act 604, the program state information received in act 602 may be transformed to generate a training data set suitable for training a model. Any of a variety of functions, such as one or more probabilistic functions, may be performed to transform the program state information. For example, words in the program state information may be removed, values in the program state information may be scaled, and/or portions of the program state information may be ignored. An example data transformation is described in more detail below with reference to FIG. 7.

In act 608, a model may be trained using the training data set generated in act 604. The model may be trained using, for example, machine learning techniques such as supervised machine learning techniques and/or unsupervised machine learning techniques. The model to be trained may be, for example, an SVM, such as a one class SVM, or a neural network. The resulting trained model may, for example, discern whether a new input complies with one or more rules identified from the training data set.

In act 608, the performance of the trained model generated in act 606 may be compared with one or more performance criteria, such as accuracy. For example, a labeled dataset may be provided as an input to the trained model and the output of the trained model may be compared with one or more performance criteria such as accuracy. If the trained model meets or exceeds the performance criteria, the model may be deployed in act 610 for use in one or more validators. Otherwise, process 600 may be repeated to generate another trained model using a different training data set. The different training data set may be generated using the same program state information in, for example, instances where the program state information transformation performed in act 604 includes one or more probabilistic functions. Alternatively, the different training data set may be generated using different program state information.

Figure 7:
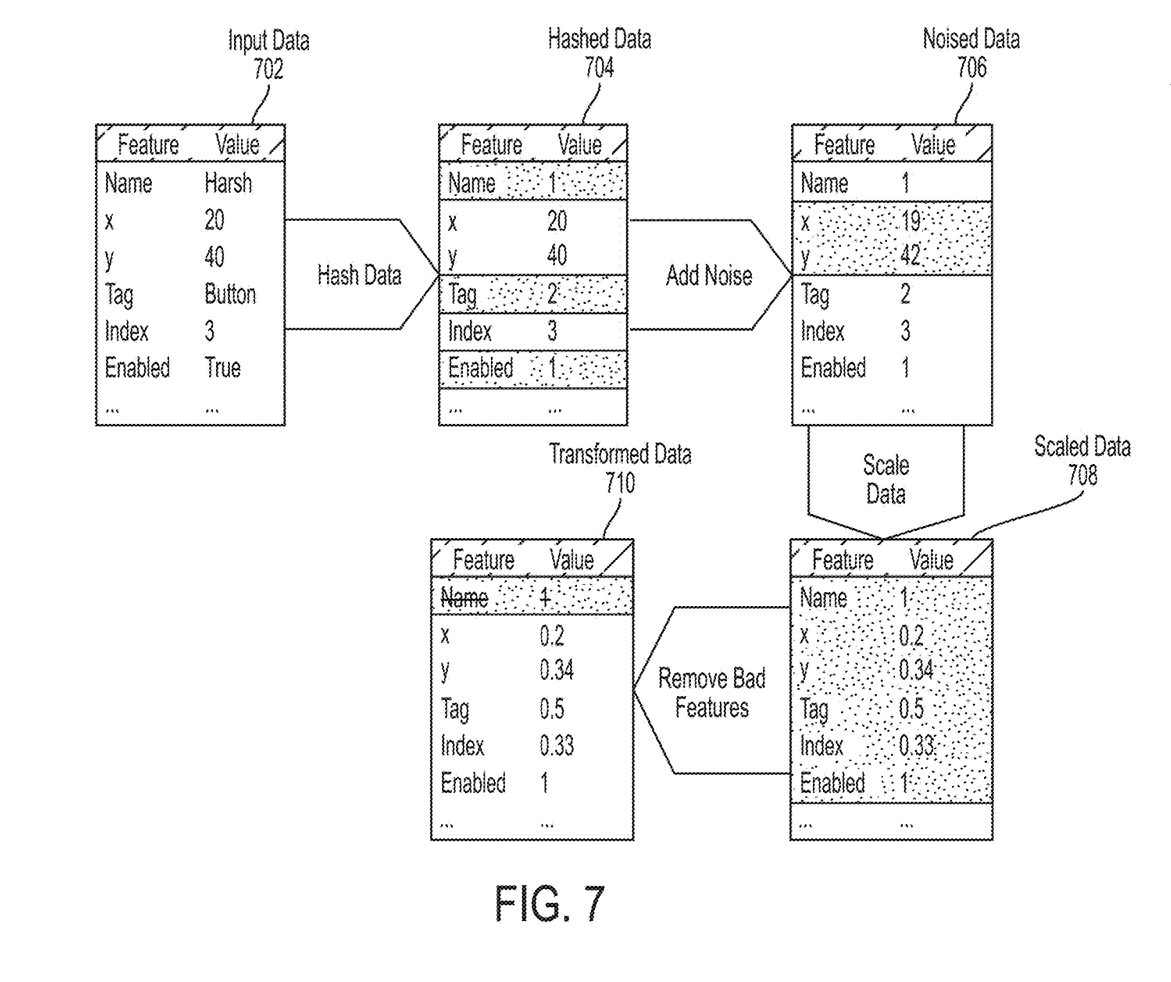
FIG. 7 is a state diagram showing an example data transformation performed to generate training data, according to some embodiments of the technology described herein.

FIG. 7 is a state diagram showing an example data transformation process from input data to a training data set suitable to train a model, such as a one class SVM. In particular, the example training data set may be suitable to train a model for the selector string feature validator described above. As shown, the state diagram 700 includes input data 702 that comprises a set of selector string features including (1) a name; (2) an x-coordinate; (3) a y-coordinate; (4) a tag; (5) an index value; and (6) an enabled state. The input data 702 is hashed using, for example, Locality Sensitive Hashing (LSH) to generate hashed data 704. The hashing may advantageously remove the words from the input data 702 that are generally not suitable for training a model (e.g., a model that only accepts numbers as inputs). The hashing may, for example, hash similar words into the same number.

Once the hashed data 704 has been generated, noise may be selectively added to the hashed data to generate noised data 706. Some features in the input data 702, such as the x and y coordinates, may inherently vary slighting from one valid execution to another without any harm to the operation of the computer program. Thus, adding noise to these selected features in creating the training data set may keep the resulting trained model from generating false positives when slight variations in these features are encountered in subsequently input data. The added noise may be, for example, white noise (e.g., adding or subtracting a small random number).

The hashed data 704 may be scaled to generate the scaled data 706 such that the range of values for each feature are similar (or the same). Scaling the hashed data may advantageously cause the resulting trained model to give features equal weight in determining whether subsequently input data complies with one or more rules. The scaling may be performed in any of a variety of ways. For example, the values may be scaled to values within a range of −1 to 1 as shown in FIG. 7. Other ranges may be employed in place of the range from −1 to 1, such as from 1 to 10.

Once the scaled data 708 has been generated, bad features may be removed to generate the final transformed data 710. Bad features may be, for example, features that vary wildly from one valid execution to another. For example, the text associated with the name of a person may vary dramatically from one valid execution to another while the text for the header of a standard table may not. Such bad features contain little or no information regarding a pattern for the model to be trained upon. Thus, these features may be identified and removed.

In some embodiments, the bad features may be identified based on their variance between valid executions. For example, features with a low variance may be automatically kept while features that exhibit a large amount of variance may be identified for further processing. For features with a high variance, the data is generally either clustered around few key values (e.g., the value of the feature is −1, 0, or 1) or is distributed somewhat uniformly (e.g., the value of the feature varies randomly between −1 and 1). If the data is clustered around a few key values, the feature likely contains valuable information regarding a pattern in the input data and should be kept. Conversely, if the data is distributed somewhat uniformly, the feature likely contained little or no information indicative of a pattern and should be removed. These two scenarios may be distinguished from each other using a clustering algorithm such as density-based spatial clustering of applications with noise (DBSCAN) algorithm. For example, if the data is generally centered around a few values, the data should be cleanly divided into a set of clusters. Conversely, if the data is distributed throughout the range, the data may be divided into numerous clusters (e.g., the number of clusters may not be substantially smaller than a number of data points).

Example Computer System

Figure 8:
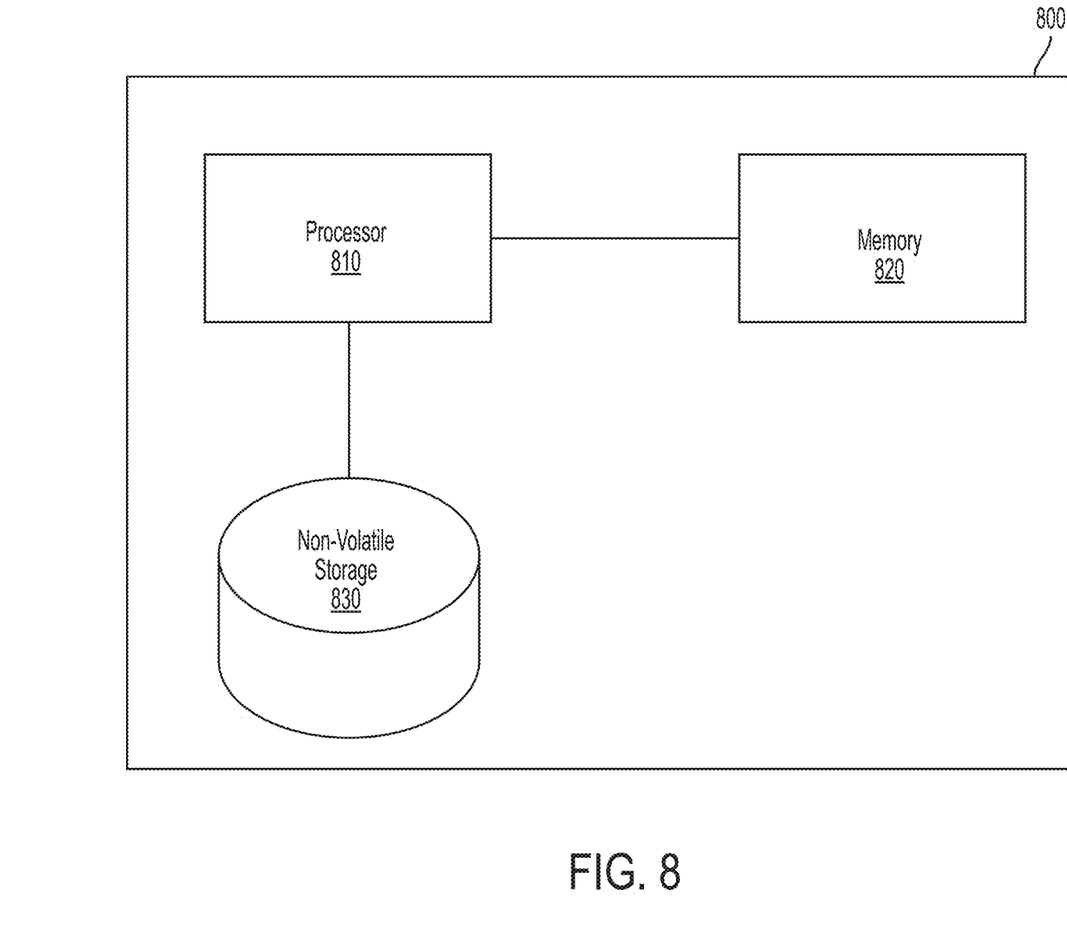
FIG. 8 is a block diagram of an example computer system, according to some embodiments of the technology described herein.

An illustrative implementation of a computer system 800 that may be used in connection with any of the embodiments of the disclosure provided herein is shown in FIG. 8. The computer system 800 may include one or more processors 810 and one or more articles of manufacture that comprise non-transitory computer-readable storage media (e.g., memory 820 and one or more non-volatile storage media 830). The processor 810 may control writing data to and reading data from the memory 820 and the non-volatile storage device 830 in any suitable manner, as the aspects of the disclosure provided herein are not limited in this respect. To perform any of the functionality described herein, the processor 810 may execute one or more processor-executable instructions stored in one or more non-transitory computer-readable storage media (e.g., the memory 820), which may serve as non-transitory computer-readable storage media storing processor-executable instructions for execution by the processor 810.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system, comprising:
at least one hardware processor; and
at least one non-transitory computer-readable storage medium storing processor executable instructions that, when executed by the at least one hardware processor, cause the at least one hardware processor to perform a method, comprising:
monitoring execution of a first computer program configured to control a second computer program to perform a task at least in part by controlling the second computer program, through a graphical user interface (GUI) and/or an application programming interface (API) of the second computer program, to perform at least one action in furtherance of the task;
detecting at least one anomaly in the execution of the first computer program, wherein detecting the at least one anomaly comprises:
detecting a change in the GUI through which the first computer program controls the second computer program, wherein detecting the change in the GUI comprises detecting at least one of: removal of at least one GUI element from the GUI, addition of at least one GUI element to the GUI, and repositioning of at least one GUI element within the GUI; and
modifying the execution of at least the first computer program based on the detected at least one anomaly.

2. The system of claim 1, wherein detecting the at least one anomaly further comprises detecting a change in a format of data obtained by the first computer program from the second computer program.

3. The system of claim 1, wherein the first computer program is configured to control the second computer program through the GUI by emulating user interactions with the GUI to cause the second computer program to perform an action through the GUI responsive to the emulated user interactions, and wherein the action is a keystroke or a mouse click.

4. The system of claim 3, wherein detecting the at least one anomaly further comprises detecting a failure of the performance of the action through the GUI of the second computer program.

5. The system of claim 1, wherein the first computer program is configured to control the second computer program through the API.

6. The system of claim 5, wherein detecting the at least one anomaly further comprises detecting removal of a command from the API of the second computer program.

7. The system of claim 5, wherein detecting the at least one anomaly further comprises detecting a failure of a command to the API of the second computer program.

8. The system of claim 1, wherein detecting the at least one anomaly further comprises detecting an anomaly in a value obtained, by the first computer program, from the GUI and/or the API of the second computer program being controlled by the first computer program.

9. The system of claim 8, wherein detecting the anomaly in the value obtained by the first computer program comprises detecting an anomaly in a value of a field displayed in the GUI of the second computer program.

10. The system of claim 1, wherein detecting the at least one anomaly further comprises detecting a change in a function of the at least one GUI element in the GUI.

11. The system of claim 1, wherein monitoring the execution of the first computer program comprises receiving program state information during execution of the first computer program indicative of a state of the first computer program and/or the second computer program being controlled by the first computer program.

12. The system of claim 11, wherein detecting the at least one anomaly in the execution of the first computer program further comprises:
determining, using at least one validator, whether the program state information complies with one or more rules; and
identifying an anomaly in the execution of the first computer program responsive to the program state information not complying with the one or more rules.

13. The system of claim 12, wherein determining whether the program state information complies with the one or more rules comprises providing an input generated based on the program state information to a trained model configured to provide an output indicative of whether the program state information complies with the one or more rules.

14. The system of claim 13, wherein the trained model comprises a trained machine learning model.

15. The system of claim 1, wherein the first computer program is configured to control the second computer program using a selector string comprising information that identifies a GUI element of the at least one GUI element within the GUI.

16. The system of claim 15, wherein detecting the at least one anomaly further comprises determining whether at least one feature of the selector string contains an anomaly.

17. The system of claim 16, wherein the at least one feature comprises a feature selected from a group consisting of: an X coordinate of the GUI element within the GUI, a Y coordinate of the GUI element within the GUI, a width of the GUI element, a height of the GUI element, text in the GUI element, a name of the GUI element, a type of the GUI element, a permission of the GUI element, and a position of the GUI element relative to another GUI element in the GUI.

18. The system of claim 1, wherein the method further comprises outputting the detected at least one anomaly at least in part by adding an anomaly event to a log file.

19. The system of claim 18, wherein the method further comprises:
identifying a number of anomaly events in the log file; and
wherein modifying execution of at least the first computer program comprises stopping execution of the first computer program and/or the second computer program responsive to the number of anomaly events in the log file exceeding a threshold.

20. The system of claim 18, wherein outputting the detected at least one anomaly comprises sending an electronic communication comprising an indication of the detected at least one anomaly.

21. The system of claim 1, wherein modifying the execution of at least the first computer program based on the detected at least one anomaly comprises pausing execution of the first computer program and/or the second computer program.

22. A method, performed by a computing device, comprising:
monitoring execution of a first computer program configured to control a second computer program to perform a task at least in part by controlling the second computer program, through a graphical user interface (GUI) and/or an application programming interface (API) of the second computer program, to perform at least one action in furtherance of the task;
detecting at least one anomaly in the execution of the first computer program, wherein detecting the at least one anomaly comprises:
detecting a change in the GUI through which the first computer program controls the second computer program, wherein detecting the change to the GUI comprises detecting at least one of: removal of at least one GUI element from the GUI, addition of at least one GUI element to the GUI, and repositioning of at least one GUI element within the GUI; and
modifying the execution of at least the first computer program based on the detected at least one anomaly.

23. At least one non-transitory computer-readable storage medium storing processor-executable instructions that, when executed by at least one processor, cause the at least one processor to perform:
monitoring execution of a first computer program configured to control a second computer program to perform a task at least in part by controlling the second computer program, through a graphical user interface (GUI) and/or an application programming interface (API) of the second computer program, to perform at least one action in furtherance of the task;
detecting at least one anomaly in the execution of the first computer program, wherein detecting the at least one anomaly comprises:
detecting a change in the GUI through which the first computer program controls the second computer program, wherein detecting the change to the GUI comprises detecting at least one of: removal of at least one GUI element from the GUI, addition of at least one GUI element to the GUI, and repositioning of at least one GUI element within the GUI; and
modifying the execution of the first computer program based on the detected at least one anomaly.

* * * * *